United States Patent [19]

Carey et al.

[11] Patent Number: 5,680,288
[45] Date of Patent: Oct. 21, 1997

[54] HOT PLUGGING OF AN ADAPTER CARD

[75] Inventors: John J. Carey; Fred Parnell, both of Raleigh; Jeffrey Buchanan Williams, Cary, all of N.C.

[73] Assignee: International Business Machines Corporation, Armonk, N.Y.

[21] Appl. No.: 487,745

[22] Filed: Jun. 7, 1995

[51] Int. Cl.$^6$ .................................................. H02H 9/00
[52] U.S. Cl. ........................ 361/118; 361/119; 361/115
[58] Field of Search ................................. 361/118, 119, 361/58, 115

[56] References Cited

U.S. PATENT DOCUMENTS

| | | | |
|---|---|---|---|
| 4,609,829 | 9/1986 | Milby et al. | 307/150 |
| 4,736,406 | 4/1988 | Molnar | 379/94 |
| 4,747,783 | 5/1988 | Bellamy et al. | 439/59 |
| 4,889,495 | 12/1989 | Kimura | 439/60 |
| 5,210,855 | 5/1993 | Bartol | 395/500 |
| 5,245,582 | 9/1993 | Kimura | 365/229 |
| 5,268,592 | 12/1993 | Bellamy et al. | 307/43 |
| 5,272,584 | 12/1993 | Austruy et al. | 361/58 |
| 5,310,998 | 5/1994 | Okuno | 235/380 |
| 5,555,510 | 9/1996 | Verseput et al. | 361/58 |

OTHER PUBLICATIONS

*IBM Technical Disclosure Bulletin*, "Method for Card Hot Plug Detection and Control" vol. 35, n5, Oct. 1992, pp. 391-394.

*Primary Examiner*—Jeffrey A. Gaffin
*Assistant Examiner*—Stephen Jackson
*Attorney, Agent, or Firm*—Joscelyn G. Cockburn; Stephen T. Keohane

[57] ABSTRACT

A circuit senses an insertion of an adapter card into a connector coupled to a processor by an MCA bus and signals control logic, which forces all other adapter cards coupled to the MCA bus off of the bus with a preempt signal, driving the bus into an arbitration mode. This may be done while the system is powered. An analog switch divides the preempt signal into one that goes to the adapter cards and a second one that is sent to the processor so that it can perform memory refresh cycles.

23 Claims, 5 Drawing Sheets

ND,288

HOT PLUGGING OF AN ADAPTER CARD

FIELD OF THE INVENTION

The present invention relates in general to data processing systems, and in particular, to a system and method for hot plugging an adapter card into a data processing system.

BACKGROUND OF THE INVENTION

With respect to data processing systems, and in particular, personal computers ("PCs"), adapter cards are printed circuit boards that enable the computer to use a peripheral device for which it does not already have the necessary connections or circuit boards or to permit upgrading of the computer to new or different hardware.

Adapter cards are typically coupled to the remainder of the computer system by the system bus, which supplies power to the adapter cards and sends and receives control and data signals to and from the adapter cards from other devices coupled to the system bus, such as the central processing unit ("CPU").

With respect to IBM compatible PS/2 computers, the design of the bus that the adapter cards and the CPU use to communicate with each other is the Micro Channel Architecture ("MCA"), which may function as either a 16-bit or a 32-bit bus and can be driven independently by multiple bus master processors.

The MCA bus was designed and initially used in inexpensive desktop personal computers. Adding new adapter cards or replacing old ones had to be done with the PC powered down and the unit dismantled. This inconvenienced only the operator of the particular PC. As the processing power of the PS/2 increased, new uses were found for MCA based devices, such as servers, routers, gateways, and bridges. When rendered inoperable, these communication products affect more than one computer user. Therefore, when changing adapter cards, down time has to be kept to a minimum.

A packaging change can make a PS/2 based adapter accessible without dismantling the unit and without a safety exposure, but the MCA bus itself does not lend itself to the interchange of adapters without significant changes. The electrical limitations of the MCA drive and timing circuitry preclude most alternatives as the hot plug requirements come from high end high performance users only.

Redesigning adapter cards for power on swapping is cost prohibitive. Thus, there is a need in the art for a device that allows for the hot plugging of adapter cards in a simple and affordable manner.

SUMMARY OF THE INVENTION

The foregoing need is satisfied by the present invention.

There are three major problems that are encountered when an adapter card is inserted or removed in a operating system using the Micro Channel Architecture. Either dataage will occur to the system or adapter card, a power on reset ("POR") or IPL (initial program load) will be initiated, or data flowing on the MCA bus will be corrupted. This disclosure will describe how all three of the situations can be handled with no apparent interrupt to the operating system if an adapter card is added or removed during normal operation.

The dataage issue is circumvented by using a controlled insertion-removal mechanism to keep the adapter card in a perpendicular orientation to the MCA circuit board that contains the receiving connector. If the angle between the card edge contacts and the bus connector exceeds six degrees during the insertion/removal process, contacts can be short-circuited, and dataage can result. A three contact point lever arm is used for the controlling device to keep the insertion angle of the adapter card well within the six degree limit, but also to provide the 45 pounds of force required to insert the card.

To satisfy safety conditions, the adapter card may be encased in a protective cassette that will accommodate "standard size" (T3 & T5) MCA cards and present a single physical format for the insertion mechanism.

To prevent the receiving system from sustaining a power dip or POR as a result of the bulk capacitance of an adapter card, the new adapter card must be precharged. This is accomplished by a slight modification in the standard MCA connector. The voltage pins and their corresponding returns closest to both ends of the system connector are elevated 0.025 inches such that they will guarantee contact prior to any of the signal or normal voltage contacts. The voltage contacts are current limited by a brute force resistor network that allows a controlled precharge of the card. The elevated pins serve a dual purpose in that they allow precharge but also perform a self-leveling task to correct any insertion angle error introduced by the insertion arm.

The mechanical insertion arm will present the adapter to the connector with a slight alignment error, generally 1 to 2 degrees. As initial contact is made (with the precharge pins) the mechanical buoyancy caused by the insertion force of the contacts will cause the leading end of the card to slow down or stop while the lagging end, having no impeding force will catch up until it also encounters the force presented by the precharge contacts at its end of the connector. This self-leveling before actual signal contact also insures the reset line, which is in the center of the connector and is also an elevated contact, to make contact. The card is held in the inoperative state by the reset line as the logic circuitry is being energized.

Current flow in the precharge conductors is monitored. When a flow is detected, a signal is generated as a warning that an adapter card is being inserted or removed. (Removal is not an issue but the circuit will allow an orderly power exit.) The warning signal is used by the control logic to create a nondisruptive entry of the new adapter cards bus drivers onto the MCA bus.

Control logic waits for a signal to go active, indicating that an adapter has been inserted. Once active there is a period of several milliseconds before the MCA bus data can be affected by the newly inserted adapter card. During this latent period, the control logic seizes control of the bus arbitration and forces all adapters off the bus by driving the MCA bus into arbitration mode. This state is maintained until the adapter card is seated and no longer a threat to disturb the data. The MCA bus is then returned to operating mode and the new adapter has its reset line released and is ready for initialization.

Although this idea was designed for the MCA bus, it is applicable to other bus structures to allow adapter insertion or removal with power on.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

Figure 1:
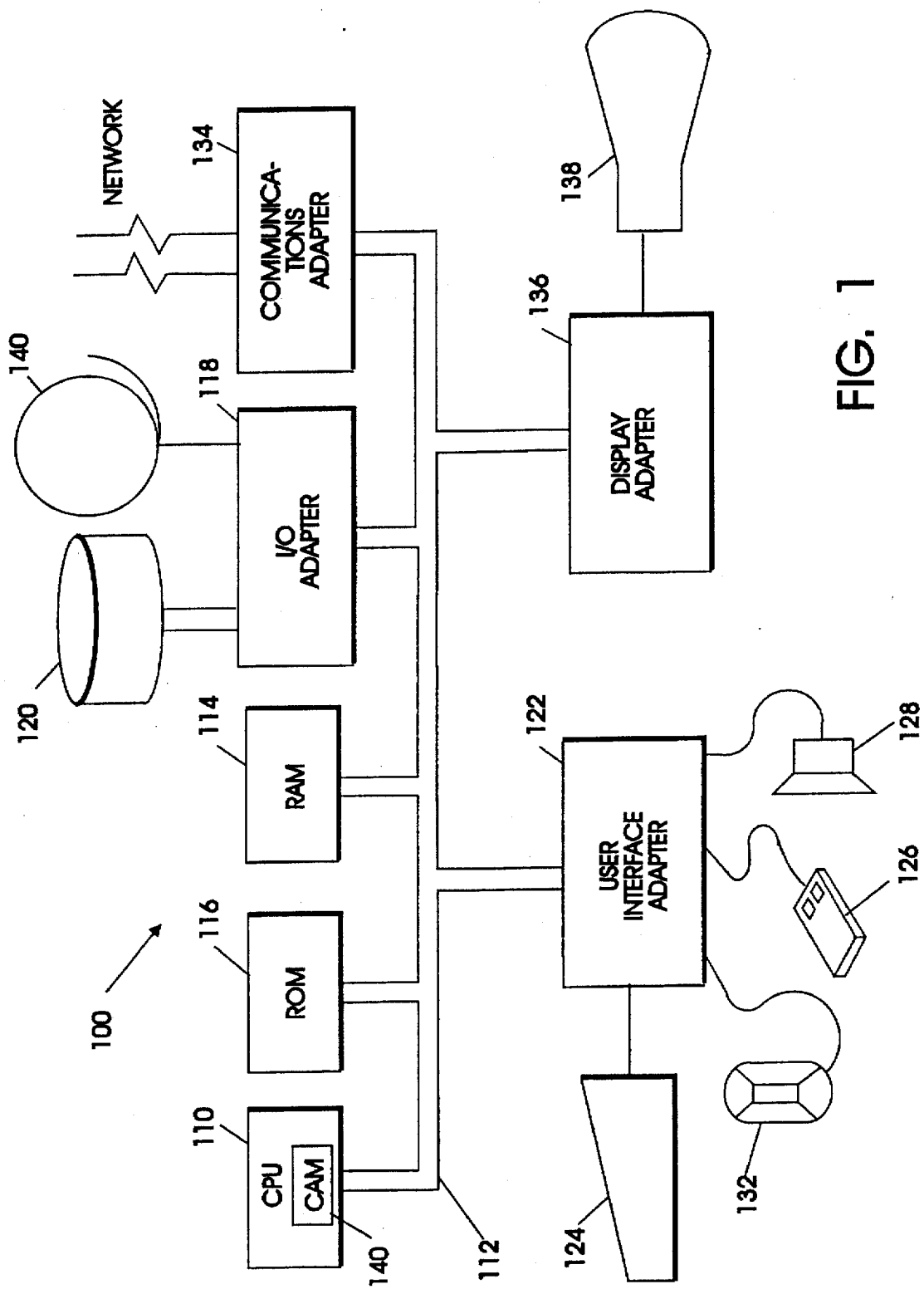
FIG. 1 illustrates a data processing system configurable in accordance with the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

A representative hardware environment for practicing the present invention is depicted in FIG. 1, which illustrates a typical hardware configuration of a data processing system 100 in accordance with the subject invention having CPU 110, such as a conventional microprocessor, and a number of other units interconnected via system bus 112. System 100 includes random access memory (RAM) 114, read only memory (ROM) 116, and input/output (I/O) adapter 118 for connecting peripheral devices such as disk units 120 and tape drives 140 to bus 112, user interface adapter 122 for connecting keyboard 124, mouse 126, speaker 128, microphone 132, and/or other user interface devices such as a touch screen device (not shown) to bus 112, communications adapter 134 for connecting system 100 to a data processing network, and display adapter 136 for connecting bus 112 to display device 138.

Bus 112 may include an MCA bus for providing communications between CPU 110 and any adapter cards. Adapters 118, 122, 134 and 136 may all be embodied within adapter cards coupled to the MCA bus. Furthermore, system 100 may be configured to have additional connector slots available for the addition of other adapter cards not shown in FIG. 1 in accordance with the present invention. The present invention will also allow for the hot plug replacement of any of adapters 118, 122, 134, and 136. This may be particularly useful with respect to communications adapter 134, which may configure system 100 to be a server or gateway within a network to which system 100 is coupled.

Figure 2:
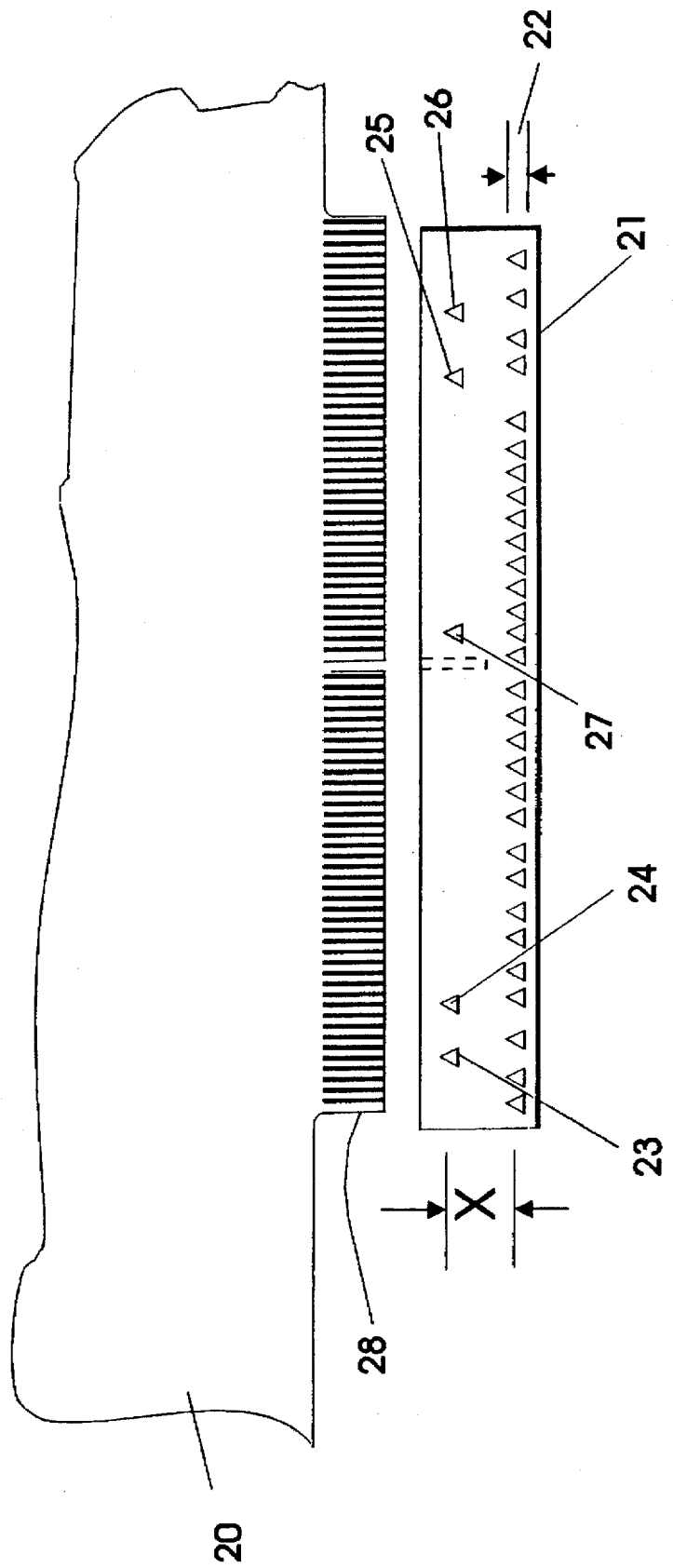
FIG. 2 illustrates the insertion of an adapter card into a connector configured in accordance with the present invention.

Referring next to FIG. 2, there is illustrated the insertion of adapter card 20 into connector 21, which is coupled to the MCA bus. In accordance with the present invention, connector 21 is modified to have selected contacts 23–27 raised X inches above their normal position. The normal position of connector contacts is illustrated along the line designated 22. X may be 0.025 inches. Contacts 23–26 supply voltages to card 20 and the corresponding returns. Contact 27 may be associated with an adapter reset signal. Contacts 23–26 are chosen as those power supply contacts being closest to the ends of connector 21 to guarantee that no voltage contacts located on the normal signal contact level 22 can precede them. This is done to both ends of connector 21 because adapter card 20 will probably have a slight tilt or bias upon insertion causing one end or the other of pins 28 to contact first with the contacts in connector 21. For sequencing purposes, whichever end contacts connector 21 first is irrelevant. Note, with X equal to 0.025 inches, an intentional bias is risky because an angle of over 6 degrees may cause adjacent contacts to short. However, X can be adjusted as desired to compensate for different anticipated insertion angles.

Besides the sequencing feature, proper contact selection can assist in removing any insertion angle error. As adapter card 20 is initially inserted into connector 21, the slight force provided by the outboard raised contacts in connector 21 will cause adapter card 20 to rotate around the centered inserting force, by using its mechanical advantage. The rotation (although very small) will stop when the opposite end of pins 28 strikes the raised contacts on the other end of connector 21. This action will insure correction to an exact orientation between adapter card 20 and the contacts of receiving connector 21. The beveled bottom of pins 28 is suited to this leveling action as actual contact is made with the precharge pins, since the beveled edge of adapter card 20 confronts the maximum force of the normal contacts prior to their actual engagement.

Note, any mechanical means for inserting or removing adapter card 20 into connector 21 at a desired angle may be utilized. For example, if X is equal to 0.025 inches, then any mechanical means for inserting adapter card 20 at an angle preferably less than 6 degrees into connector 21 may be suitable.

Figure 3:
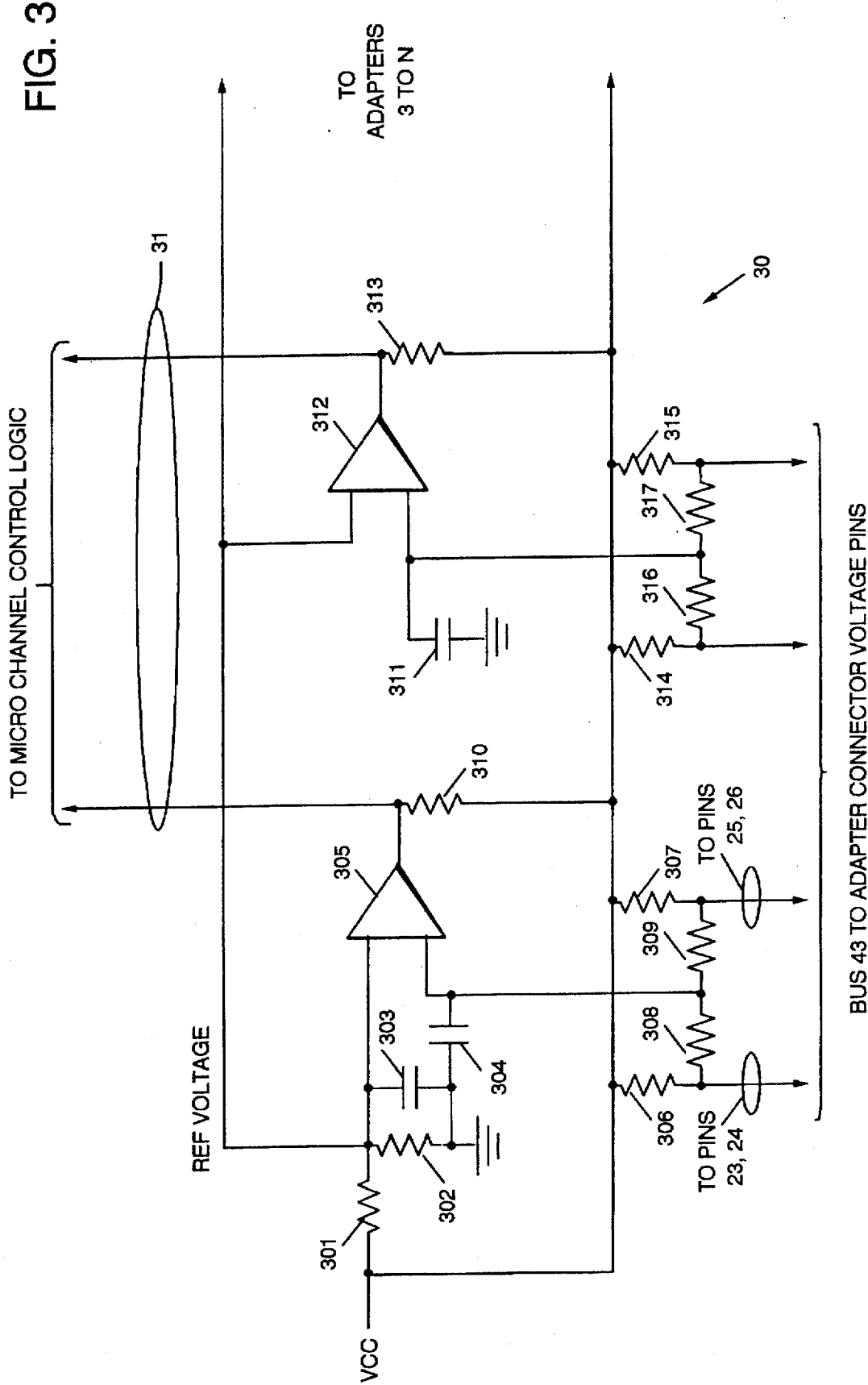
FIG. 3 illustrates a precharge and monitor circuit used within the present invention.

Referring next to FIG. 3, there is illustrated a circuit diagram of the precharge and monitor circuit 30 used within the present invention to notify control logic 40 (see FIG. 4) when an adapter card has been inserted or removed. Circuit 30 is implemented on the circuit board containing the card connectors and the power distribution to them.

The connector position 21 for each adapter card 20 that will be inserted or removed in accordance with the present invention will have a precharge and monitor circuit that will control the application and removal of the VCC voltage required for adapter card operation in that connector location.

Resistors 301 and 302 form a voltage divider to create a reference voltage that all the monitor circuits in a single system 100 will share. Capacitor 303 is for decoupling. This reference voltage is fed into one leg of voltage comparator (305). The reference point is chosen to be just below the minimum voltage possible for the potential applied to the precharge bus. This, in practice, would be in the 4.6 volt range for TTL circuits. The other leg of voltage comparator 305 is controlled by the potential present on the adapter card side of the current limit resistors 306 and 307. When current is flowing in current limit resistors 306, 307, the potential as seen by voltage comparator 305 will be less than the reference voltage and comparator 305 will change state. The initial short circuit as the adapter 20 card charges up with current is limited only by the current limiting resistor 306. A very low impedance resistor value is used for current limiting, generally in the order of 1.0 to 2.0 ohms as determined by the power supply capability. The sense voltage will dip near zero then rise following the normal RC transient time constant until the second current limited contact is made to contacts 25, 26. The potential will again follow the new RC curve until the normal voltage contacts along line 22 are made. At that time, the flow in current limit resistors 306, 307 becomes zero. This two-tiered charge scheme reduces the initial load on the power supply VCC and allows a higher potential in the final precharge to the adapter voltage plane, which in effect short circuits the current limit resistors 306, 307. Resistors 308, 309 feed the precharge voltage to comparator 305. Because 308, 309 are very large in comparison to resistors 306, 307 (ratio of 100 or greater), very little current flows and they, in effect, reflect the potential applied at the adapter precharge contacts 23–26. During initial contact (only one precharge contact made (e.g., pins 23, 24)), comparator 305 will see a potential that is the difference between the precharge bus and the adapter being precharged. As contacts 25, 26 make contact with circuit 30, the junction between resistor 308 and 309 will reflect the actual voltage appearing on the voltage plane of the adapter card being precharged because current flow potential drop across the sense resistors 308, 309 will be zero.

As the normal voltage contact along line 22 begin to conduct, the sense input will return to its normal level and the comparator 305 output will switch back to its former state. All the signal contacts will be made, the adapter card will be reset, and bus disruption will no longer be a potential problem. A time delay may be designed into the bus control logic 40 (see FIG. 4) to allow additional circuit settling time before normal system bus control is restored.

Capacitor 304 is used as a decoupler on the sense leg of comparator 305.

Because comparator 305 is an unloaded entity, its output is pulled up by load resistor 310 when it is not in the driven state. This output from comparator 305 is directed to the bus control logic 40 along bus 31 as an indication of having data corrupted by an adapter card being inserted or removed.

The vertical spacing (0.025") of the adapter connector contacts and the motion of the adapter card being inserted or removed provides (as shown in FIG. 2) the timing required by the circuit 30.

A second sense/monitor circuit comprising components 311–317 is shown to illustrate the sharing of the reference voltage. All other components are separate but identical in value. Components 311–317 are used for sensing a second adapter card.

Figure 4:
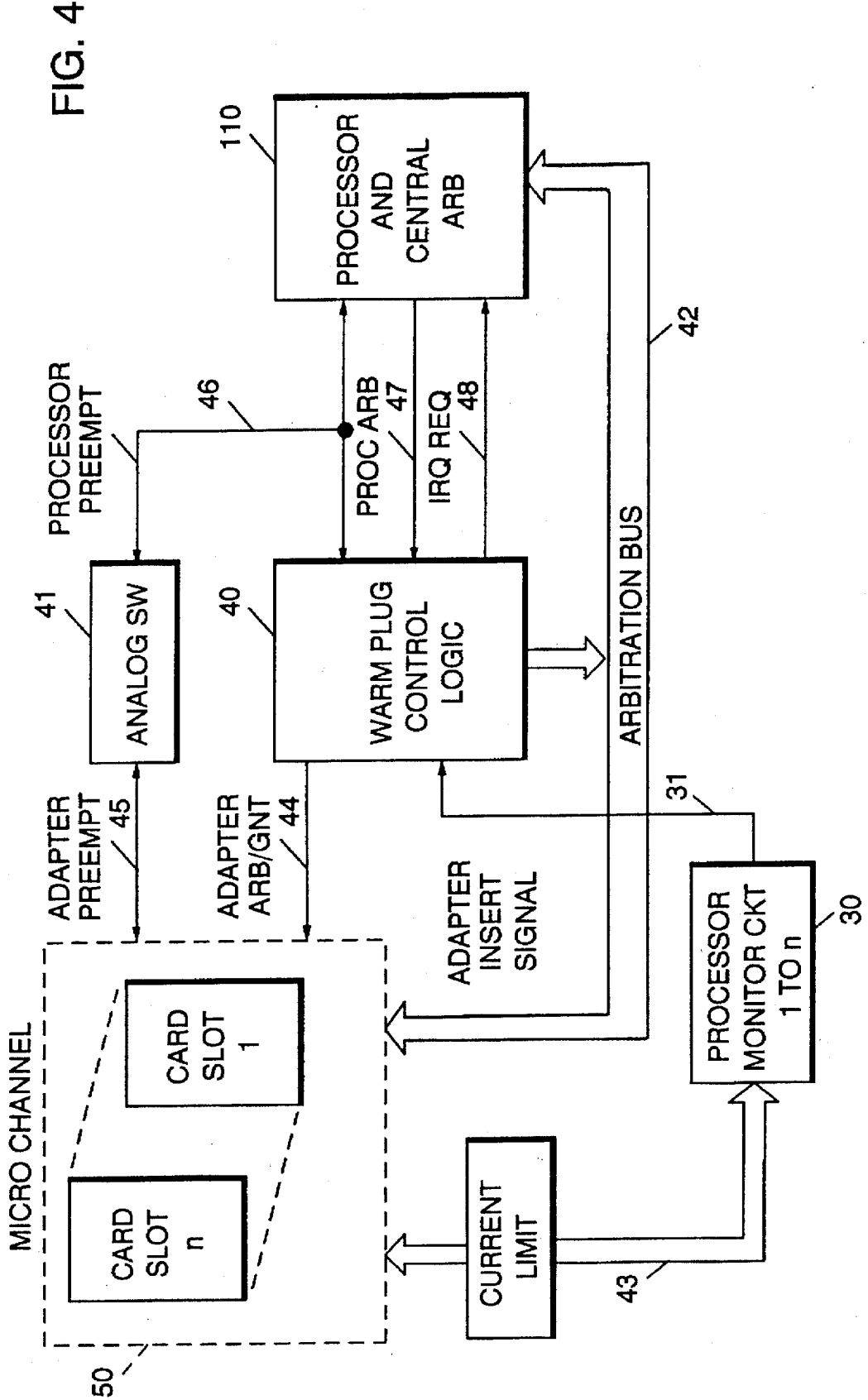
FIG. 4 illustrates a block diagram of the bus control logic used in the present invention.

Referring next to FIG. 4, there is illustrated a block diagram of an implementation of the present invention. Precharge and monitor circuit 30 is as illustrated in FIG. 3. The adapter insert signal is supplied from circuit 30 to control logic 40 by lines 31. The adapter insert signal is initiated by the precharge monitor circuit 30 as described above with respect to FIGS. 2 and 3 upon the insertion of an adapter card into one of the card slots coupled to MCA bus 50 which results in a sensed voltage on bus 43.

When the adapter insert signal is initiated by circuit 30, control logic 40 forces all adapters off MCA bus 50 through the use of the PREEMPT signal which is a well-known signal in the art. The PREEMPT signal is supplied through bus 49 to analog switch 41, which sends the PREEMPT signal to the adapter cards through bus 45 and to processor 110 through bus 46. Analog switch 41 may be a low impedance CMOS solid state switch available as part no. 74HC4066d from Motorola, Inc. Analog switch 41 is used to isolate processor 110 from MCA bus 50 such that control logic 40 can prevent an adapter PREEMPT signal from reaching processor 110.

At the same time, the adapter arbitration/grant signal on bus 44 is held in the arbitration mode, which does not allow any adapters to put information on bus 50.

The processor arbitration signal supplied from processor 110 to control logic 40 on bus 47 is controlled in normal mode only by processor 110. This signal is routed through control logic 40 so that it can be blocked when an adapter precharge signal from circuit 30 is active indicating that an adapter card is being inserted or removed. For control purposes, the line is renamed adapter arbitration/grant after it is gated by control logic 40 and is supplied from control logic 40 to bus 50 by line 44.

The IRQ request signal on line 48 is typically a signal from an adapter card to processor 110 indicating to processor 110 that the adapter card needs attention. Control logic 40 generates this signal indicating to processor 110 that an adapter card has either been inserted or removed. By interrogating the interrupt, the adapter card that has been changed can be determined and actions in software can be made. For example, control logic 40 will present processor 110 with an interrupt on line 48 after the card insert signal has gone inactive. Control logic 40 contains a 1 of X slot status latch so the system can read this latch to determine what adapter slot has had a change in the state. This interrupt is required since the entire card removal/replacement process is transparent to system processor 110, until the process is completed and an interrupt is presented to processor 110.

Arbitration bus 42 is a typical arbitration bus for coupling processor 110 to adapter cards.

Arbitration bus 42 is part of the Micro Channel Architecture. It provides a means for the main system processor 110 and IO adapters to request and gain ownership of MCA 50. Arbitration bus 42 is a 4-bit bus, which all arbitrating participants monitor. An arbitration cycle is requested when an adapter(s) lowers preempt. This signal is normally an open collector signal common to all arbitrating participants. Once the Central arbitrator (controller of arb/gnt signal) sees a preempt, it raises the arb/grant signal (line 44) to arb state. All adapters needing bus access place their predefined arbitration level (0–15) on the arb bus 42. Those participants with lower priority levels withdraw their requests by not driving their less significant arb bits. The Arbitration level of the highest-priority requester is valid on arb bus 42 after a settling time. The arb/gnt signal will then go to the grant state, indicating to the highest priority device that it has control of bus 50. This adapter will maintain control of bus 50 until it is preempted off bus 50 by other devices requesting access to MCA 50 that have higher priority. To achieve adapter hot plug with systems containing Micro-channel, the bi-directional, open collector signal preempt, is split into two distinct signals. When card insert is not active, analog switch 41 is closed, allowing the system to function normally. When card insert is sampled active (using the 14.3 MHZ system supplied clock) control logic 40 opens analog switch 41. This ensures that adapter preempt is blocked from going to the central Arbitrator and adapter preempts cannot cause control logic 40 to relinquish bus ownership to adapters requesting access. Control logic 40 also splits the MCA arb/gnt signal into two unidirectional signals. Once card insert is sampled active, adapter arb/gnt 44 is held in the arbitration state, which ensures that all MCA adapters will not drive address or data onto bus 50. Proc Arb 47 is then used by control logic 40 to determine when the central arb 110 has granted bus control to control logic 40.

Control logic 40 can be implemented anywhere in the system where access to the central arb point and the adapter bus can be achieved. Control logic 40 may be implemented using an Altera EPM5032jc EPLD (Erasable Programmable Logic Device).

Figure 5:
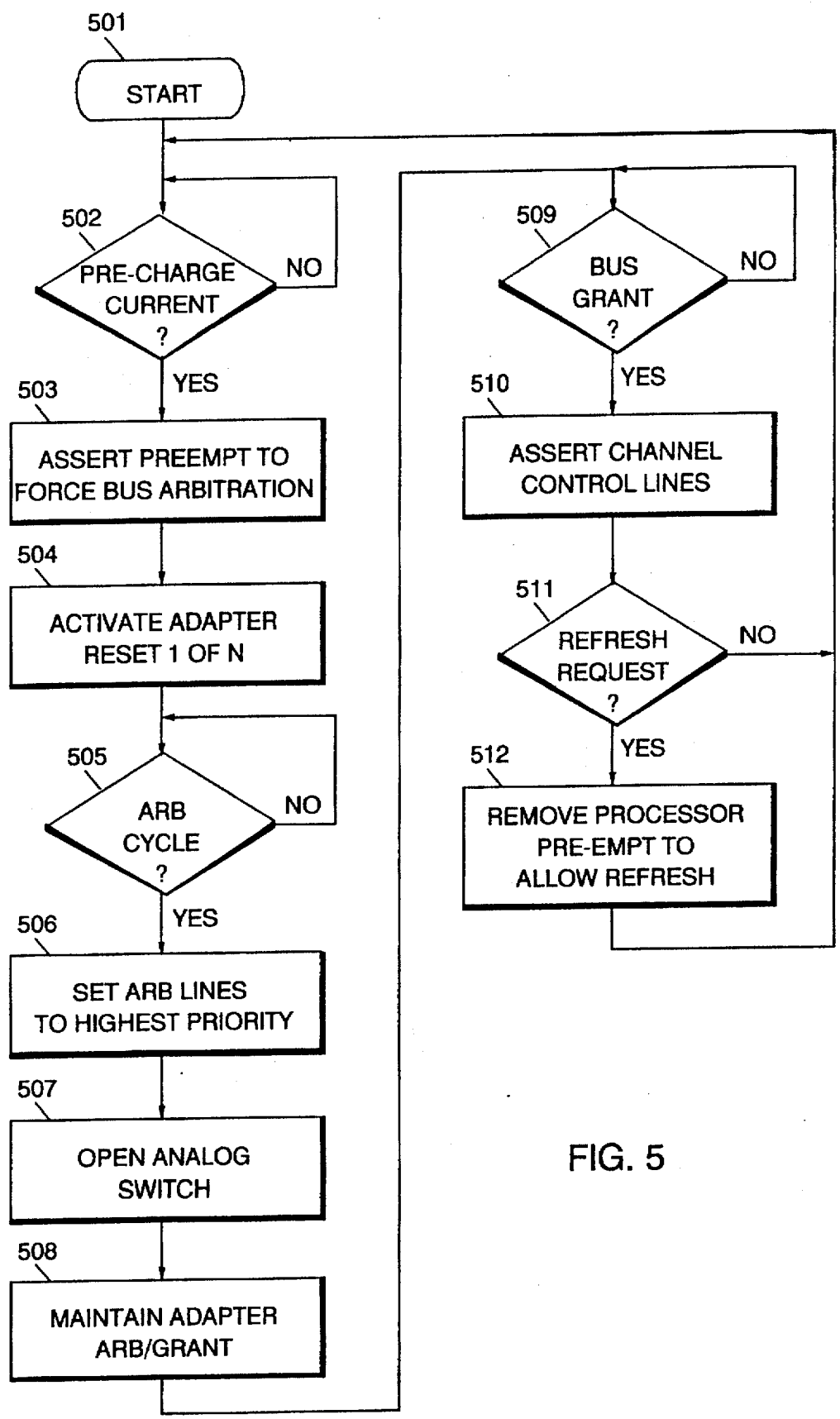
FIG. 5 illustrates a flow diagram of control logic 40 illustrated in FIG. 4.

Referring next to FIG. 5, in conjunction with FIG. 4, there is illustrated a flow diagram of an operation of control logic 40 in accordance with the present invention. One skilled in the art of logic circuit design would be capable of designing control logic 40 from the diagrams and descriptions of FIGS. 4 and 5.

The flow starts at step 501 (Start represents system power on) and proceeds to step 502 where a waiting period is started wherein control logic 40 waits to receive an adapter insert signal via line 31 indicating that a precharge current has been established in circuit 30 and responds to the insertion or removal of an adapter card. Once an adapter insert signal has been received, the process proceeds to step 503 wherein control logic 40 sends via line 49 a PREEMPT signal forcing all adapter cards off of MCA bus 50. MCA architecture states that once a bus owner sees an active preempt signal it has 7.6 microseconds to complete its bus activity and remove its arbitration lines. This allows other devices to gain access to the bus through the Arb/gnt cycle.

Next, in step 504, the adapter reset signal is activated for the card inserted or removed. The card insert signal also sets the appropriate adapter reset signal (1 of X) coming from control logic 40. This ensures that the bus drivers of the adapter being inserted into the card socket are in a known state. The adapter reset signal keeps the adapter card in a known state regardless of whether it is being inserted or removed. When the insert or remove cycle has been completed, an interrupt is generated for processor notification that an adapter has been changed. This interrupt is supplied via line 48 to processor 110. Control logic 40 uses the 14.3 MHz system supplied clock to sample the state of the card insert signal using a transparent D-type latch inside the Altera EPLD.

Next, step 505 is implemented wherein control logic 40 waits for the next bus arbitration cycle. In step 506, when the next bus arbitration cycle has occurred, the arbitration level on arbitration bus 42 is driven to its highest priority by control logic 40 to insure exclusive use of arbitration bus 42 during the precharge period. Arbitration bus 42 is driven to the highest priority, level zero. As stated above, all lesser priority arbitrating participants remove their levels, thus control logic 40 ends up with bus ownership. Processor 110 requires use of arbitration bus 42 every 15 microseconds for memory refresh. To satisfy this requirement, appropriate bus control signals are split by analog switch 41 to allow refresh without relinquishing control to other adapter cards that may be trying to gain access at this time (step 507). As described above, analog switch 41 splits the PREEMPT signal into an adapter PREEMPT signal sent via line 45 to the micro channel bus and the processor PREEMPT signal sent to processor 110 via line 46. Normally these two lines are driven together, but when the adapter insert signal on line 31 is active, the two are driven separately to allow processor requests for memory refresh. The system memory controller is required to perform a memory refresh every 15 microseconds. For this refresh to occur, all bus users must remove themselves from bus 50 when they see the preempt signal active. For this reason, Preempt was split so control logic 40 could comply with the System refresh requirement. When control logic 40 sees proc preempt 46 active, it completes its present cycle, but continues to drive the Arb level to the highest priority. This condition allows the system to perform a memory refresh, while the arb/gnt signal 47 is in the arb state. When arb/gnt 47 goes to the gnt state, control logic 40 gains control of the micro-channel 50.

In step 508, control logic 40 maintains control of the adapter cards by generating an adapter ARB/GRANT signal sent by line 44, which is transparent during normal bus operation, but when an adapter insert signal is active, the ARB/GRANT signal is held in the ARB state to keep other adapters from gaining control of arbitration bus 42.

Thereafter, in step 509, control logic 40 waits for a grant of the bus. Steps 509 thru 512 show the relationship between the Processor Central Arbitrator and control logic 40. As stated above, all bus owners must relinquish bus control to allow the system to refresh its memory. If control is not given up, the system processor will present a catastrophic bus timeout error. As long as the card insert signal 31 is active, the adapters residing in MCA 50 are held in the arb state, keeping them off but 50. Control logic 40 continues to maintain bus control allowing only system refresh until the card insertion removal is complete.

Although the present invention and its advantages have been described in detail, it should be understood that various changes, substitutions and alterations can be made herein without departing from the spirit and scope of the invention as defined by the appended claims.

What is claimed is:

1. A system for permitting a hot plug insertion of an adapter card into an adapter card connector coupled by a bus to a data processing system while said data processing system is powered, said system comprising:

means for detecting an insertion of said adapter card into said adapter card connector; and means, coupled to said detecting means, for forcing all other adapter cards off said bus in response to detection of said insertion of said adapter card into said adapter card connector, wherein said forcing means further comprises:

means for driving said bus into an arbitration mode so as to seize control of said bus.

2. The system as recited in claim 1, further comprising:

means for returning said bus to a normal operating mode subsequent to a complete seating of said adapter card into said adapter card connector.

3. The system as recited in claim 1, further comprising:

means for activating an adapter reset signal for said adapter card to maintain said adapter card in a known state; and means for releasing said adapter reset signal subsequent to a complete seating of said adapter card into said adapter card connector.

4. The system as recited in claim 1, wherein said means for detecting said insertion of said adapter card into said adapter card connector further comprises:

means for detecting current being supplied to said adapter card.

5. The system as recited in claim 1, wherein said driving means further comprises:

means for sending on said bus a preempt signal.

6. The system as recited in claim 5, further comprising:

means for dividing said preempt signal into one preempt signal that is sent on said bus to said adapter card and said other adapter cards and a second preempt signal that is sent to a processor coupled to said data processing system.

7. The system as recited in claim 6, further comprising:

means for receiving from said processor a refresh request; and means for removing said second preempt signal that is sent to said processor in response to receipt to said refresh request, wherein said one preempt signal that is sent on said bus to said adapter card and said other adapter cards is maintained during this period of time when said second preempt signal that is sent to said processor is removed.

8. In a data processing system, a method for permitting a hot plug insertion of an adapter card into an adapter card connector coupled by a bus to said data processing system while said data processing system is powered, said method comprising the steps of:

detecting an insertion of said adapter card into said adapter card connector;

forcing all other adapter cards off said bus in response to said detecting of said insertion of said adapter card into said adapter card connector, wherein said forcing step further comprises a step of driving said bus into an arbitration mode so as to seize control of said bus, wherein said driving step further comprises the step of sending on said bus a preempt signs; and returning said bus to a normal operating mode subsequent to a complete seating of said adapter card into said adapter card connector.

9. The method as recited in claim 8, further comprising the steps of:

activating an adapter reset signal for said adapter card to maintain said adapter card in a known state; and releasing said adapter reset signal subsequent to a complete seating of said adapter card into said adapter card connector.

10. The method as recited in claim 8, further comprising the steps of:

dividing said preempt signal into one preempt signal that is sent on said bus to said adapter card and said other adapter cards and a second preempt signal that is sent to a processor coupled to said data processing system;

receiving from said processor a refresh request; and removing said second preempt signal that is sent to said processor in response to receipt to said refresh request, wherein said one preempt signal that is sent on said bus to said adapter card and said other adapter cards is maintained during this period of time when said second preempt signal that is sent to said processor is removed.

11. The method as recited in claim 8, wherein said step of detecting said insertion of said adapter card into said adapter card connector further comprises the step of:

detecting current being supplied to said adapter card.

12. A data processing system comprising a processor, a memory device, a storage device, an input device, and an output device coupled together via a system bus, said system including an MCA bus adaptable for coupling said processor to at least one adapter card, said system adaptable for permitting a hot plug insertion of an adapter card into an adapter card connector coupled to said MCA bus while said data processing system is powered, said system comprising:

circuit means for detecting an insertion of said adapter card into said adapter card connector; and control logic means, coupled to said circuit means, for forcing all other adapter cards off said MCA bus in response to detection of said insertion of said adapter card into said adapter card connector, wherein said control logic means further comprises a means for driving said MCA bus into an arbitration mode so as to seize control of said MCA bus.

13. The system as recited in claim 12, wherein said control logic means further comprises a means for returning said MCA bus to a normal operating mode subsequent to a complete seating of said adapter card into said adapter card connector.

14. The system as recited in claim 12, wherein said circuit means includes electrical contacts on said connector that are elevated above other contacts on said connector so that said electrical contacts make contact with electrical contacts on said adapter card before said other contacts make contact with said adapter card, wherein said electrical contacts on said connector couple a voltage supply to said adapter card.

15. The system as recited in claim 12, wherein said control logic means further comprises:

means for activating an adapter reset signal for said adapter card to maintain said adapter card in a known state; and means for releasing said adapter reset signal subsequent to notification, received from said circuit means, of a complete seating of said adapter card into said adapter card connector.

16. The system as recited in claim 15, wherein said driving means further comprises:

means for sending on said MCA bus a preempt signal.

17. The system as recited in claim 16, further comprising:

an analog switch for dividing said preempt signal into one preempt signal that is sent on said MCA bus to said adapter card and said other adapter cards and a second preempt signal that is sent to said processor coupled to said data processing system.

18. The system as recited in claim 17, wherein said control logic means further comprises:

means for receiving from said processor a refresh request; and means for removing said second preempt signal that is sent to said processor in response to receipt to said refresh request, wherein said one preempt signal that is sent on said MCA bus to said adapter card and said other adapter cards is maintained during this period of time when said second preempt signal that is sent to said processor is removed.

19. A system for permitting a hot plug insertion of an adapter card into an adapter card connector coupled by a bus to a data processing system, while said data processing system is powered, said data processing system comprising:

means for detecting an insertion of said adapter card into said adapter card connector;

means, coupled to said detecting means, for forcing all other adapter cards off said bus in response to detection of said insertion of said adapter card into said adapter card connector;

means for activating an adapter reset signal for said adapter card to maintain said adapter card in a known state; and means for releasing said adapter reset signal subsequent to a complete seating of said adapter card into said adapter card connector.

20. A system for permitting a hot plug insertion of an adapter card into an adapter card connector coupled by a bus to a data processing system while said data processing system is powered, said system comprising:

means for detecting an insertion of said adapter card into said adapter card connector, wherein said means for detecting said insertion of said adapter card into said adapter card connector further comprises:

means for detecting current being supplied to said adapter card; and means, coupled to said detecting means, for forcing all other adapter cards off said bus in response to detection of said insertion of said adapter card and to said adapter card connector.

21. In a data processing system, a method for permitting a hot plug insertion of an adapter card into an adapter card connector coupled by a bus to said data processing system while said data processing system is powered, said method comprising the steps of:

detecting an insertion of said adapter card into said adapter card connectors;

forcing all other adapter cards off said bus in response to said detecting of said insertion of said adapter card into said adapter card connector;

returning said bus to a normal operating mode subsequent to a complete seating of said adapter cards into said adapter card connector;

activating an adapter reset signal for said adapter card to maintain said adapter card in a known state; and releasing said adapter reset signal subsequent to a complete seating of said adapter card into said adapter card connector.

22. In a data processing system, a method for permitting a hot plug insertion of an adapter card into an adapter card connector coupled by a bus to said data processing system while said data processing system is powered, said method comprising the steps of:

detecting an insertion of said adapter card into said adapter card connector, wherein said detecting step further comprises the step of:

detecting current being supplied to said adapter card;

inserting of said adapter card into said adapter card connector; and returning said bus to a normal operating mode subsequent to a complete seating of said adapter card into said adapter card connector.

23. A data processing system comprising a processor, a memory device, a storage device, an input device, and an output device coupled together via a system bus, said system including an MCA bus adaptable for coupling said processor to at least one adapter card, said system adaptable for permitting a hot plug insertion of an adapter card into an adapter card connector coupled to said MCA bus while said data processing system is powered, said system comprising:

circuit means for detecting an insertion of said adapter card into said adapter card connector, wherein said circuit means includes electrical contacts on said connector that are elevated above other contacts on said connectors so that electrical contacts may contact with electrical contacts on said adapter card before said other contacts make contact with said adapter card, wherein said electrical contacts on said connector couple a voltage supply to said adapter card; and control logic means, coupled to said circuit means, for forcing all other adapter cards off said MCA bus in response to detection of said insertion of said adapter card into said adapter card connector.

* * * * *